(12) United States Patent
Colvig et al.

(10) Patent No.: US 6,986,008 B2
(45) Date of Patent: Jan. 10, 2006

(54) BACKUP FIRMWARE IN A DISTRIBUTED SYSTEM

(75) Inventors: Arthur John Colvig, Tucson, AZ (US); Brian Gerard Goodman, Tucson, AZ (US); Leonard George Jesionowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 10/341,377

(22) Filed: Jan. 14, 2003

(65) Prior Publication Data

US 2004/0139294 A1  Jul. 15, 2004

(51) Int. Cl.
*G06F 12/00* (2006.01)

(52) U.S. Cl. .................................................. 711/162

(58) Field of Classification Search ........ 711/161–162, 711/170, 154; 713/1–2
See application file for complete search history.

(56) References Cited

U.S. PATENT DOCUMENTS

| | | | |
|---|---|---|---|
| 5,464,435 A * | 11/1995 | Neumann | 607/9 |
| 5,878,256 A | 3/1999 | Bealkowski et al. | 395/652 |
| 6,029,232 A | 2/2000 | Honda | 711/162 |
| 6,237,091 B1 | 5/2001 | Firooz et al. | 713/1 |
| 6,357,021 B1 | 3/2002 | Kitagawa et al. | 714/41 |
| 6,473,856 B1 * | 10/2002 | Goodwin et al. | 713/2 |
| 2002/0091807 A1 | 7/2002 | Goodman | 709/221 |
| 2003/0126511 A1 * | 7/2003 | Yang et al. | 714/39 |

FOREIGN PATENT DOCUMENTS

EP  1 168 176 A2  1/2002

* cited by examiner

*Primary Examiner*—Matthew D. Anderson
(74) *Attorney, Agent, or Firm*—John H. Holcombe

(57) ABSTRACT

In a distributed system of modules in a network, each module having an associated processor node comprising a processing unit for operating the associated module. The processing unit comprises a processor interface for communication in the network; and nonvolatile memory for storing code for the processing unit for operating the associated module, and for storing backup code for at least one other processing unit of another processor node in the network, the backup code for operating an associated module of the another processor node. In response to a request, the processing unit supplies the backup code to a processor node to be used to restore the code for operating the module associated with the requesting processor node.

10 Claims, 9 Drawing Sheets

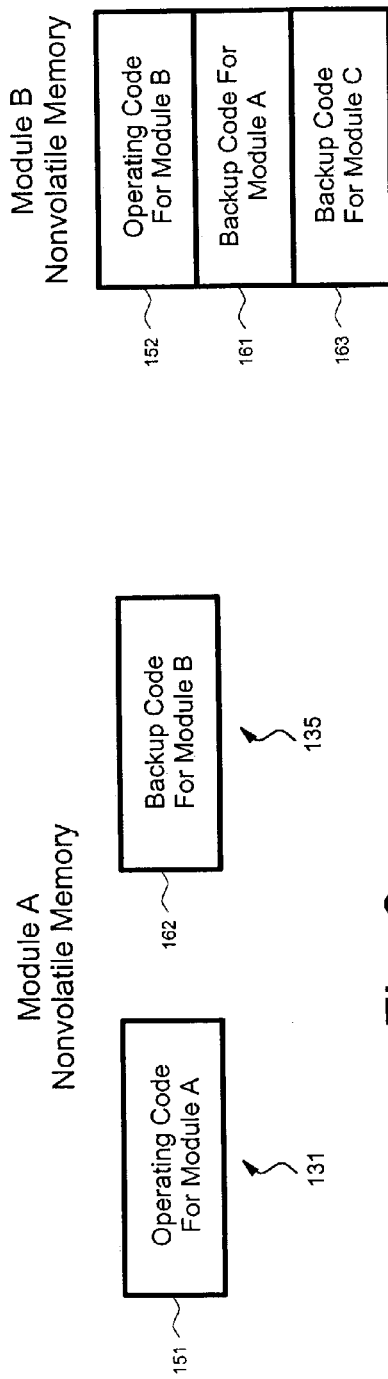
Fig. 2a
Fig. 2b
Fig. 2c
Fig. 2d

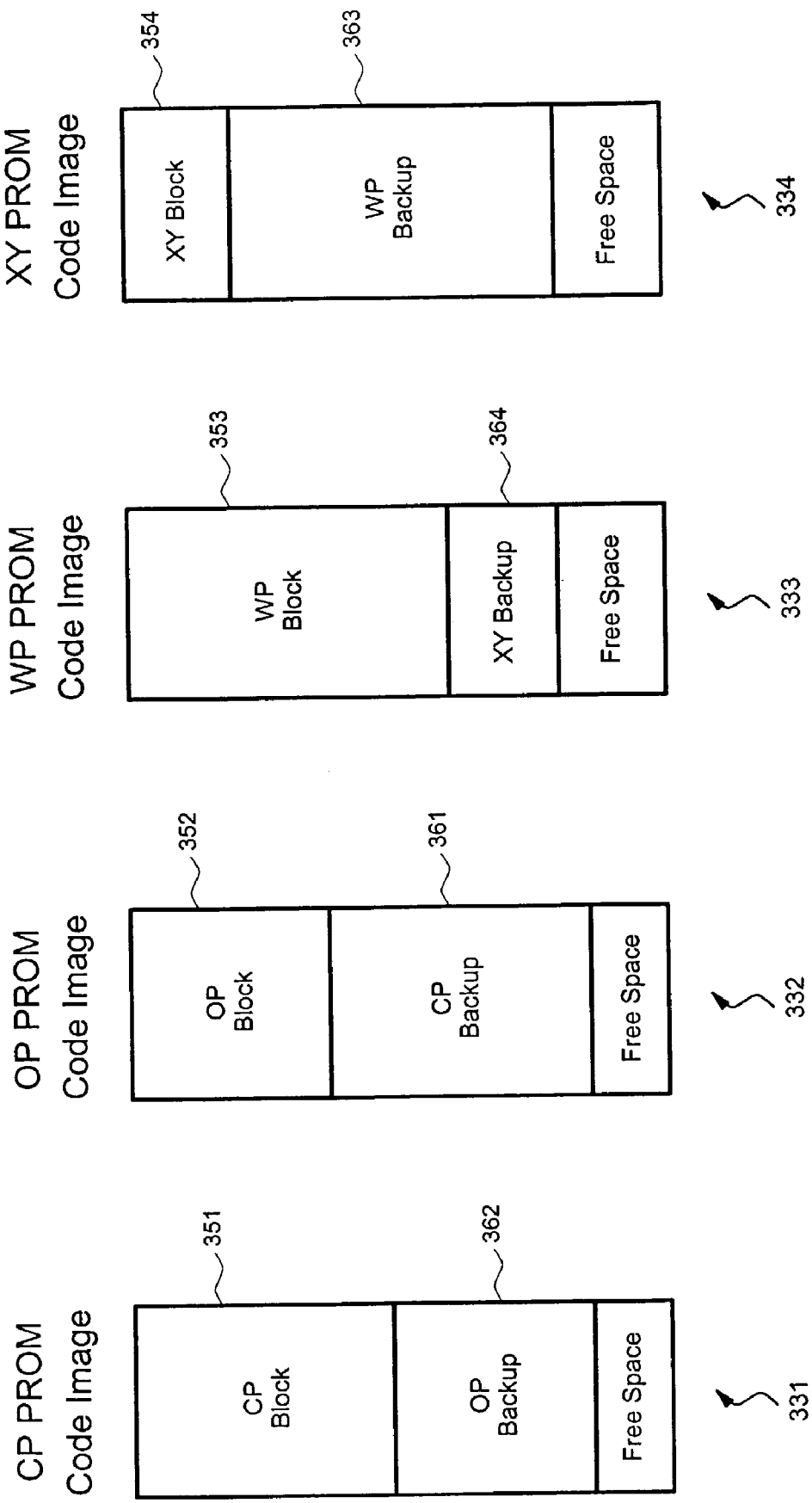

US 6,986,008 B2

BACKUP FIRMWARE IN A DISTRIBUTED SYSTEM

FIELD OF THE INVENTION

This invention relates to a distributed system of modules, and, more specifically, to at least a plurality of the modules having associated processor nodes interconnected in a network, the processor nodes having code for operating the associated module.

BACKGROUND OF THE INVENTION

Distributed systems may comprise a plurality of modules, at least some of which have associated processor nodes interconnected in a network. The processor nodes typically comprise a processing unit for operating the associated module and a processor interface for providing communication of the processor node in the network. The processing unit executes code, such as computer readable program code, which may be stored in memory, such as a nonvolatile memory, in order to operate the associated module. The modules and associated processors may be termed embedded systems.

An example of a distributed system comprises an automated data storage library which stores removable data storage media in storage shelves, and has at least one data storage drive to read and/or write data on the removable data storage media. An accessor robot transports the removable data storage media, which may be in the form of cartridges, between the data storage drives and the storage shelves. An operator panel allows an operator to communicate with the library, the operator panel also sensing other interaction with the library, such as opening a door and inserting or removing cartridges from the library. Also, a controller controls host interaction with the library, which may include interaction between the host and the data storage drives.

In the example of an IBM 3584 UltraScalable Tape Library, two processor nodes are provided for the accessor robot modules, an accessor controller controls basic accessor functions including cartridge handling by a gripper, accessor work queueing, reading cartridge labels, etc., and an XY controller controls the X and Y motion of the accessor robot. An operator panel controller processor node controls basic operator panel module functions including display output, keyboard input, I/O station sensors and locks, etc. A medium changer controller processor node controls controller module functions including host interaction, including host communications, drive communication, "Ethernet" communications, power management, etc. The processor nodes are interconnected by an network, such as a CAN (Controller Area Network), which comprises a multi-drop network. Other accessor robot modules, and operator station modules may be added, each with the associated processor nodes.

Other examples of distributed systems comprise industrial control systems and automobile and aircraft multi-processor systems.

In the distributed system of coassigned U.S. patent application Ser. No. 09/755,832, filed Jan. 5, 2001, a complete code image is provided for each of the processor nodes which provides code that may be executed for operating any of the modules. In the distributed system of coassigned U.S. patent application Ser. No. 09/734,917, filed Dec. 13, 2000, a master code image is provided by a master source, which may have a nonvolatile store, and may be used to refresh volatile memory of any processor node that has been powered off.

An issue to be addressed is that of backup code, or code that may be employed by a processor node that needs to restore its code image. For example, the code image for one of the processor nodes may become compromised in some way during operation, the code image utilized by a processor node may be partially erased, the module may be replaced and the processor node code image is incorrect, or a processor of a node may be unavailable, such as from the network, when one or more of the other processor nodes are updated. The processor node may then enter an error state, which may require operator intervention. A backup copy of the code must then be located and utilized to restore the functioning of the module of the erroneous processor node. The operator may select a complete code image, comprising the code for all of the processor nodes, from another processor node, or may select a master code image from a master nonvolatile store, but must first be assured that the code image is correct and can serve as a system backup. Impediments to utilizing a complete code image duplicated at each processor node, or at a master source, are the requirement for nonvolatile memory for the full amount of code, and the need to update the complete or master code image even when only the code for one processor node module is actually updated. In the event there are different levels of complete code at different processor nodes, a downlevel complete code at one processor node may not be correct or may not be serviceable as a potential backup for another processor node.

SUMMARY OF THE INVENTION

A distributed system, a processor node for a distributed system, a module for a distributed system, an automated data storage library, and a computer program product, in accordance with aspects of the present invention, provide backup code for processor nodes of the distributed system.

In one embodiment, the distributed system of modules comprises a network and a plurality of modules, a module comprising at least one associated processor node. The associated processor node comprises a processing unit for operating an associated module; a processor interface for providing communication of the processor node in the network; and nonvolatile memory for storing code for the processing unit for operating the associated module, and for storing backup code for at least one other processing unit of another processor node in the network, the backup code for operating an associated module of the another processor node. The backup image of the processor nodes, when taken together, thus form part or all of a system aggregate. The resultant system aggregate of backup code images and operating code image takes, at each processor node, only a small portion of the total amount of space required for the total system aggregate. As the result, considerable nonvolatile memory storage space is saved as compared to a system in which a complete code image for all modules is duplicated at each nodule.

In a further embodiment, the processing unit of the module processing node responds to a request for backup code received at the processor interface, supplying the backup code at the processor interface. As the result, the backup code may be supplied to the requesting processor node to be used to restore the code for operating the module associated with the requesting processor node.

In another embodiment, the processing unit additionally maintains identification of the type of the backup code. For example, the type of backup code may relate to the type of module that the backup code is intended to operate. The processing unit responds to a request for the identification received at the processor interface, supplying the identification at the processor interface.

In a still further embodiment, a processing unit requiring restoration of its code, for example, responding to a restore signal, sends a request at the processor interface for backup code, the backup code comprising code for the processing unit for operating the associated module.

Additionally, the processing unit may maintain identification of the type of the code for operating the associated module; and, in requiring restoration of its code, sends a request at the processor interface for an identification of type of backup code. Then, in response to receiving a response to the request at the processor interface, the processing unit compares the received identification to the maintained identification; and, in response to the comparison indicating the identification is valid for replacement of the code for operating the associated module, receives the backup code and replaces at least a portion of the code for operating the associated module with the backup code.

In another embodiment, a processing unit additionally maintains identification of at least one other processor node having backup code for operating the associated module; and comprises logic responsive to a restore signal to send a request at the processor interface to the other processor node for the backup code. Additionally, the processing unit may maintain identification of the level of the code for operating the associated module, and comprises logic responsive to a restore signal to, in response to receiving an identification of level of backup code of the other processor node, compare the received identification to the maintained identification; and, in response to the comparison indicating that the identification is valid for replacement of the code for operating the associated module, replace at least a portion of the code for operating the associated module with the backup code.

In a further embodiment, the processing unit of a processor node additionally maintains identification of level of the backup code; and additionally comprises logic responsive to an update of the backup code to update the identification and to send notice of the update at the processor interface on the network.

For a fuller understanding of the present invention, reference should be made to the following detailed description taken in conjunction with the accompanying drawings.

BRIEF DESCRIPTION OF THE DRAWINGS

FIGS. 2A, 2B, 2C and 2D are diagrammatic representations of nonvolatile memories of the processing nodes of FIG. 1;

FIGS. 8A, 8B, 8C and 8D are diagrammatic representations of nonvolatile memories of four of the processing nodes of FIG. 7.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
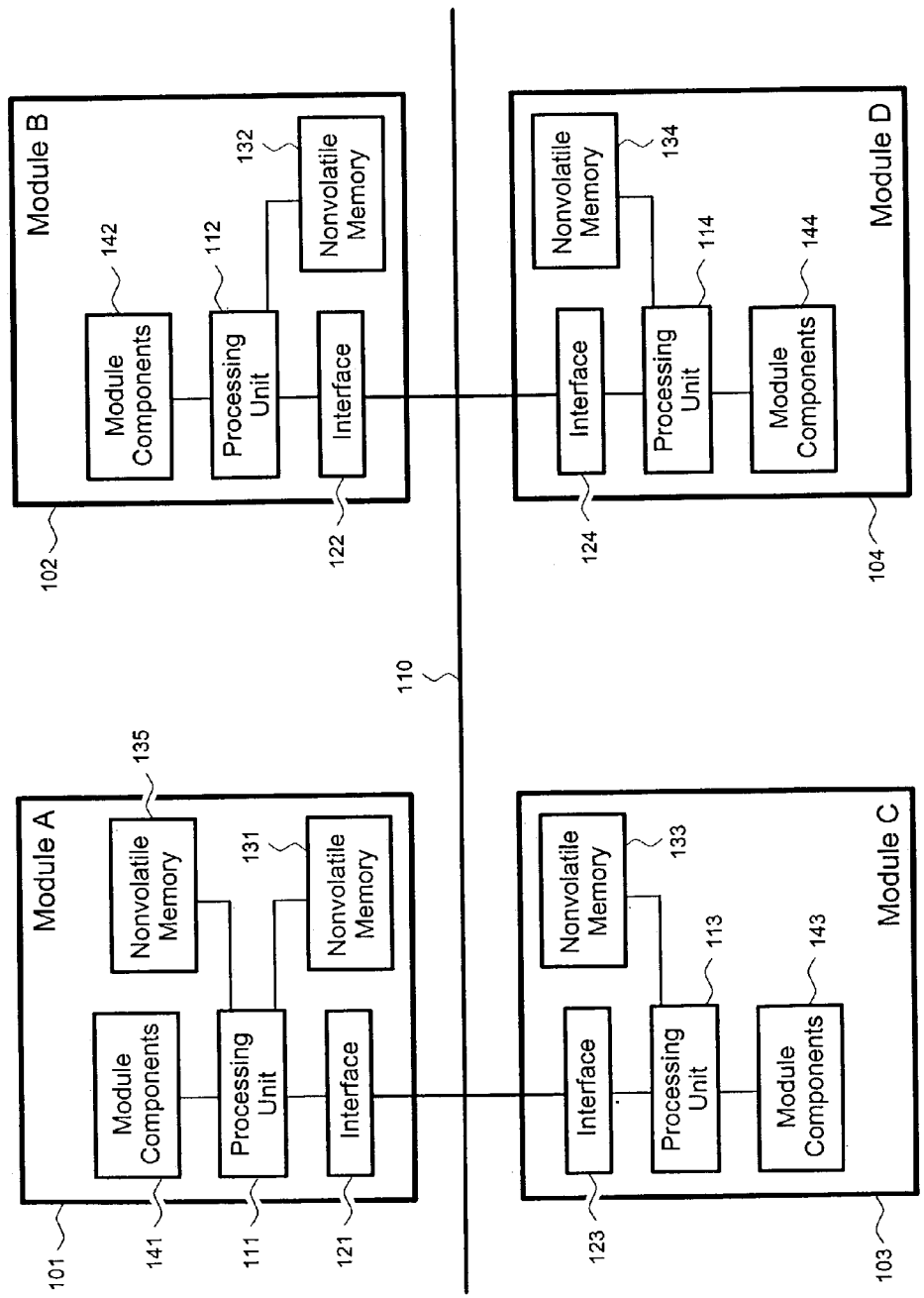
FIG. 1 is a block diagram of an embodiment of a distributed system of modules and processing nodes which implements the present invention.

Referring to FIG. 1, an embodiment of a distributed system 100 is illustrated comprising a plurality of modules 101, 102, 103, 104 with processors at nodes of the system, and a network 110 serving to interconnect the modules of the system. "Network" is defined as comprising a communication between two or more nodes, direct or indirect, and may comprise one or more subnetworks. Each of the illustrated modules comprises at least one associated processor node. The associated processor node comprises a processing unit for operating an associated module, shown as processing units 111, 112, 113, 114; a processor interface for providing communication of the processor node in the network 110, shown as interfaces 121, 122, 123, 124; and nonvolatile memory for storing code for the processing unit for operating the associated module, shown as nonvolatile memory 131, 132, 133, 134. In the example of FIG. 1, an additional nonvolatile memory 135 is provided for the processing node of module 101, as will be discussed. The nonvolatile memory may comprise an NVRAM (nonvolatile random access memory), PROM (programmable read only memory), ROM (read only memory), flash memory, EEPROM (electrically erasable programmable read only memory), battery backed-up RAM (random access memory), hard disk drive, etc. Alternatively, the nonvolatile memory may be located in the processing unit. The processing unit 111, 112, 113, 114 comprises a programmable processor to operate the modules and their components, thereby operating the system. The module components are shown as components 141, 142, 143, 144. The processing unit may comprise any microprocessor device known in the art, and operates under the control of program code, often called "firmware", since the code is related to the module hardware, for example, constituting a library. The code is such that the processing units operate the components of the system. Although the code is typically maintained in the nonvolatile memory, part or all of the code may be transferred to a high speed RAM (random access memory) of the processing unit for operating the processing unit, and accessed from the nonvolatile memory as needed.

Referring to FIGS. 1 and 2A, 2B, 2C and 2D, in accordance with an embodiment of the present invention, nonvolatile memory 131, 132, 133, 134 stores the code 151, 152, 153, 154 for the processing unit for operating the associated module, and for storing backup code for at least one other processing unit of another processor node in the network, the backup code for operating an associated module of the another processor node.

As an example, nonvolatile memory 135 of FIGS. 1 and 2A stores backup code 162 for the processing unit 112 of the processing node of module 102. If the code image 152 of FIGS. 1 and 2B for the processor node of module 102 becomes compromised in some way during operation, is partially erased, the module is replaced and the code image is incorrect, or a processor of a node may be unavailable, such as from a network, when one or more of the other processor nodes are updated, the processing unit 112 begins a restore process, sending a request for the backup code 162.

Referring to FIGS. 1 and 2A, 2B, 2C and 2D, nonvolatile memory 132 of the processor node of module 102 stores the backup code 161 for the processing unit 111 of the processing node for operating module 101, and stores a copy 163 of backup code for the processing unit 113 of the processing node of module 103, for operating module 103. Nonvolatile memory 133 of the processor node of module 103 stores the backup code 164 for the processing unit 114 of the processing node for operating module 104. Nonvolatile memory 134 of the processor node of module 104 stores a second copy 173 of the backup code for the processing unit 113 of the processing node for operating module 103.

The code in accordance with the present invention for conducting the backup and restore process may be embodied in the operating code for the module, such as operating code 151, may be embodied in code maintained in the processing unit, such as processing unit 112, or may be stored separately in the nonvolatile memory, such as code 177 of nonvolatile memory 133.

Hence, herein the term "nonvolatile memory" comprises one or more devices, separate from or forming a part of a processor, capable of storing code in a nonvolatile manner.

Since the backup code images are stored in a distributed fashion, such that the backup code images and/or operating code images form part or all of a system aggregate, each backup code image forms a portion of the system aggregate. As the result, considerable nonvolatile memory storage space is saved as compared to a system in which a complete code image for all modules is duplicated at each module.

For example, if all the code images for a distributed system are illustrated by FIGS. 2A, 2B, 2C, 2D, the backup code 162 for the processing unit 112 of module 102, stored in nonvolatile memory 135, occupies only a very small portion of the system aggregate. For example, compare nonvolatile memory 135, as a portion of an aggregate, to the nonvolatile memory required to duplicate at each module, a prior art complete operating code image for all modules of the system.

It may be desirable to update the firmware of a system with an aggregate code load rather than a series of individual code loads. Further, it may be desirable to have part or all of the aggregate code load of compatible levels. Even if the system code load is not updated as an aggregate, the individual code loads can be considered as an aggregate.

In one embodiment of the backup and restore process in accordance with the present invention, the processing unit (e.g., processing unit 111), may maintain identification of the type of the code for operating the associated module; and, in requiring restoration of its code, sends a request at the processor interface for an identification of type of backup code. The type of backup code is defined herein as representing the kind of module that the backup code is intended to operate. An identifier may be set and maintained as a part of the backup and restore code, or may be a part of the module interface with its processor node. Hence, the term "maintained" is defined as having access to an identifier. An example of an identifier comprises a bit position which is set to a "1" state in a word. The processing units also may maintain identification of the type of backup code that is stored in the associated nonvolatile memory. An identifier may be set and maintained as a part of the backup and restore code, or may comprise part of the backup code stored in nonvolatile memory. Therefore, again, the term "maintained" is defined as having access to an identifier. Thus, the type of backup code 161 stored in nonvolatile memory 132 is for operating the kind of module comprising module 101. A processing unit responds to a request for the identification received at the processor interface, supplying the identification at the processor interface. For example, if the operating code for module 101 requires restoration, each of the processing units 112, 113, 114 which have received the request for identification at the associated interface 122, 123, 124, responds with the identification of the backup code stored in the associated nonvolatile memory, respectively, of backup code 161 for operating module 101 and of backup code 163 for operating module 103, of backup code 164 for operating module 104, and of backup code 173 for operating module 103. Optionally, operating code may be used as the backup code for another similar module, or backup code and operating code may comprise a single unit, as will be discussed.

Then, in response to receiving a response to the request at the processor interface (e.g., processor interface 121), the requesting processing unit (e.g., processing unit 111) compares the received identification to the maintained identification; and, in response to the comparison indicating an identification is valid for replacement of the code for operating the associated module (e.g., the received identifier for backup code 161, stored at module 102), requests the backup code, receives the backup code (e.g., backup code 161) and replaces at least a portion of the code (e.g., code 151) for operating the associated module with the backup code. As another embodiment of the same function, the requesting processor node sends a request with the desired type of backup code at the processor interface. In this instance only the processing unit having the backup code of the desired type stored in the associated nonvolatile memory responds with the identification of type of backup code (e.g., the processing unit 112 of module 102 sends the identification of the type of backup code 161).

In another embodiment, a processing unit additionally maintains identification of at least one other processor node having backup code for operating the module associated with the processing unit. This means that, for example, processing unit 111 of module 101 maintains the identity of the processing node of module 102 as having the backup code 161 for operating the module 101. In the example, processing unit 111 responds to a restore signal to send a request at the processor interface to the processor node of module 102 for the backup code, and processing unit 112 looks up the backup code in the nonvolatile memory 132 and sends the backup code 161 over interface 122 to the processor node of module 101.

Additionally, the processing unit (e.g., processing unit 111) may maintain identification of level of the code for operating the associated module, and comprises logic responsive to a restore signal to, in response to receiving an identification of level of the backup code (e.g., backup code 161) of the other processor node, compare the received identification to the maintained identification; and, in response to the comparison indicating that the identification is valid for replacement of the code for operating the associated module, replace at least a portion of the code for operating the associated module (e.g., code 151) with the backup code (e.g., backup code 161).

In a further embodiment, the backup code may be updated, for example, to a new level. The processing unit of a processor node additionally maintains identification of level of the backup code; and additionally comprises logic responsive to an update of the backup code to update the identification and to send notice of the update at the processor interface on the network. The notice may be broadcast to all other processor nodes, or may be sent directly to the processor node which would use the backup code to restore its code. For example, in response to an update to the backup code 173 stored in nonvolatile memory 134 of module 104, processing unit 114 updates its identification of the level of the backup code and sends notice of the identification of the update to the processor node of module 103. If the other copy 163 of the backup code for the processor node of module 103 is not updated, and the operating code 153 were also updated, only the copy 173 of the backup code would be valid. Conversely, if the operating code 153 was at the same level as backup code copy 163, only copy 163 of the backup code would be valid.

Figure 3:
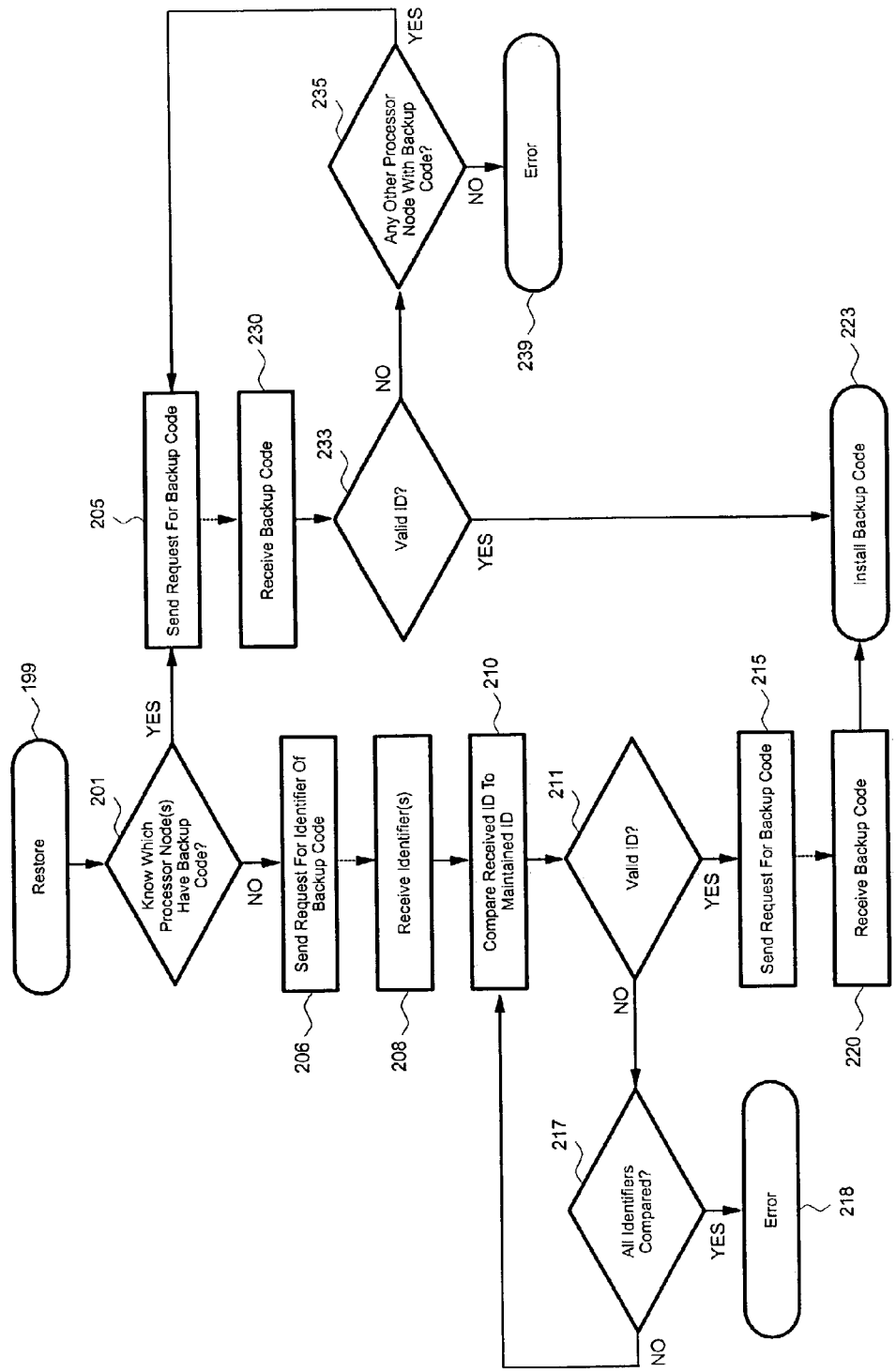
FIGS. 3, 4 and 5 are flow charts depicting embodiments of the computer implemented method of the present invention.

Referring to FIG. 3, and to FIGS. 1 and 2A, 2B, 2C and 2D, an embodiment of the restore process is illustrated, beginning at step 199. Step 199 may be termed a "restore signal", but is defined as any detection that a code image for operating a processor node has become, or is becoming, compromised in some way, as discussed above. The "restore signal" may thus comprise an error state or represent signaling in any form or format. Optional step 201 indicates whether the processing unit of the processor node whose code is to be restored knows the processing unit that has the backup code for the processor node. For example, processing unit 111 of module 101 maintains the identity of the processing node of module 102 as having the backup code 161 for operating the module 101, meaning a "YES" in step 201. The process then continues at step 205. If the processing unit with backup code is not known to the processor node whose code is to be restored, "NO", the process continues at step 206. Step 201 is a step in a general backup and restore process, and the code may be programmed to instead directly access step 205 for a backup and restore process where the backup code locations are known, or programmed to instead directly access step 206 for a backup and restore process where the backup code locations are not known. If so, the process steps of the other leg may be deleted from the process.

In step 206, the processing unit of the processor node whose code is to be restored sends a request at the associated processor interface for identification of type and/or level of backup code. As discussed above, in one alternative, the request only is supplied to all of the other processor nodes, and, as another embodiment of the same function, the requesting processor node sends a request with the desired type and/or level of backup code at the processor interface. In this second instance only the processing unit having the backup code of the desired type and/or level stored in the associated nonvolatile memory responds with the identification of type and/or level of backup code (e.g., if the processing unit 111 of module 101 sends the request for the type of backup code which operates module 101, only the processing unit 112 of module 102 responds with the type of backup code 161). In the first instance, each of the other processor nodes responds with an identification of each copy of backup code stored in its associated nonvolatile memory (e.g., each of the processing units 112, 113, 114 which have received the request for identification at the associated interface 122, 123, 124, responds with the identification of the backup code stored in the associated nonvolatile memory, respectively, backup code 161 for operating module 101 and backup code 163 for operating module 103, backup code 164 for operating module 104, and backup code 173 for operating module 103).

Additionally, the processing unit (e.g., processing unit 111) may maintain identification of level of the code for operating the associated module, and comprises logic responsive to a restore signal to, request the level of the backup code, which is also supplied by the responding processing nodes.

In step 208, the requesting processor node receives the identifier or identifiers in response to the request, the identifier or identifiers comprising the type and/or the level of the backup code. For example, if the request included the type of backup code desired, the response may only indicate which request is being responded to, effectively comprising an indication of the type. Then, in step 210, in response to receiving a response to the request at the processor interface (e.g., processor interface 121), the requesting processing unit (e.g., processing unit 111) compares the received identification (type and/or level) to the maintained identification. If, in step 211, the comparison of step 210 indicates an identification is valid for replacement of the code for operating the associated module (e.g., the received identifier for backup code 161), the processing unit whose code is being restored requests the backup code in step 215.

The comparison step 210 may compare the identifiers of all responses (if more than one) at one time, or may compare the responses singly, for example, as received in step 208. If comparing the identifiers singly, after step 211 indicates the identifier is not valid, step 217 tests whether all the identifiers have been compared. This may require a wait time at step 208 to assure that all the potential responses have been received. If not all the received identifiers have been compared. to the maintained identification, step 217 cycles the process back to step 210 to compare the next identifier, which may be separately received in step 208. If all the identifiers have been compared without a valid identifier, the restore process cannot be conducted, and an error is indicated in step 218.

In step 220, the backup code requested in step 215 is received, (e.g., backup code 161) and, in step 223, the processing unit installs the backup code, replacing at least a portion of the code (e.g., code 151) for operating the associated module with the backup code.

In the embodiment of step 205, a processing unit additionally maintains identification of at least one other processor node having backup code for operating the associated module (e.g., processing unit 111 of module 101 maintains the identity of the processing node of module 102 as having the backup code 161 for operating the module 101). The processing unit of the processor node being restored (e.g., processing unit 111) responds to a restore signal to, in step 205, send a request at the processor interface to the processor node of module 102 for the backup code. The processing unit receiving the request (e.g., processing unit 112) looks up the backup code in the nonvolatile memory (e.g., nonvolatile memory 132), and sends the backup code (e.g., backup code 161) over the processor interface (e.g., processor interface 122) to the requesting processor node (e.g., the processor node of module 101).

In step 230, the processing unit whose code is being restored receives the backup code from the processing unit of the other processing node to which the request was made.

As discussed above, the processing unit (e.g., processing unit 111) may maintain identification of level of the code for operating the associated module, and comprises logic responsive to a restore signal to, in response to receiving an identification of level of the backup code (e.g., backup code 161) of the other processor node in step 230, compare, in step 233, the received identification to the maintained identification. In response to the comparison indicating that the identification is valid for replacement of the code for operating the associated module, the processing unit whose code is being restored (e.g., processing unit 111), in step 223, installs the backup code, replacing at least a portion of the code (e.g., code 151) for operating the associated module with the backup code (e.g., backup code 161).

If step 233 indicates that the received backup code or its level is not valid, step 235 determines whether any other processor node has a copy of the backup code. For example, the nonvolatile memory 132 of processor node 102 has one copy 163 of backup code for the processor node of module 103, and the nonvolatile memory 134 of processor node 104 has another copy 173 of backup code for the processor node of module 103. If there is another copy, step 235 cycles the process back to step 205 to request the next copy of backup code. If step 233 indicates that the received backup code or its level is not valid, and step 235 determines that there is no other processor node with a backup copy, an error is indicated in step 239.

Alternative arrangements of the steps of FIG. 3 can be envisioned by those of skill in the art. In addition, steps may be eliminated or added. For example, steps 233, 235 and 239 may be eliminated, and step 230 leads directly to step 223.

Figure 4:
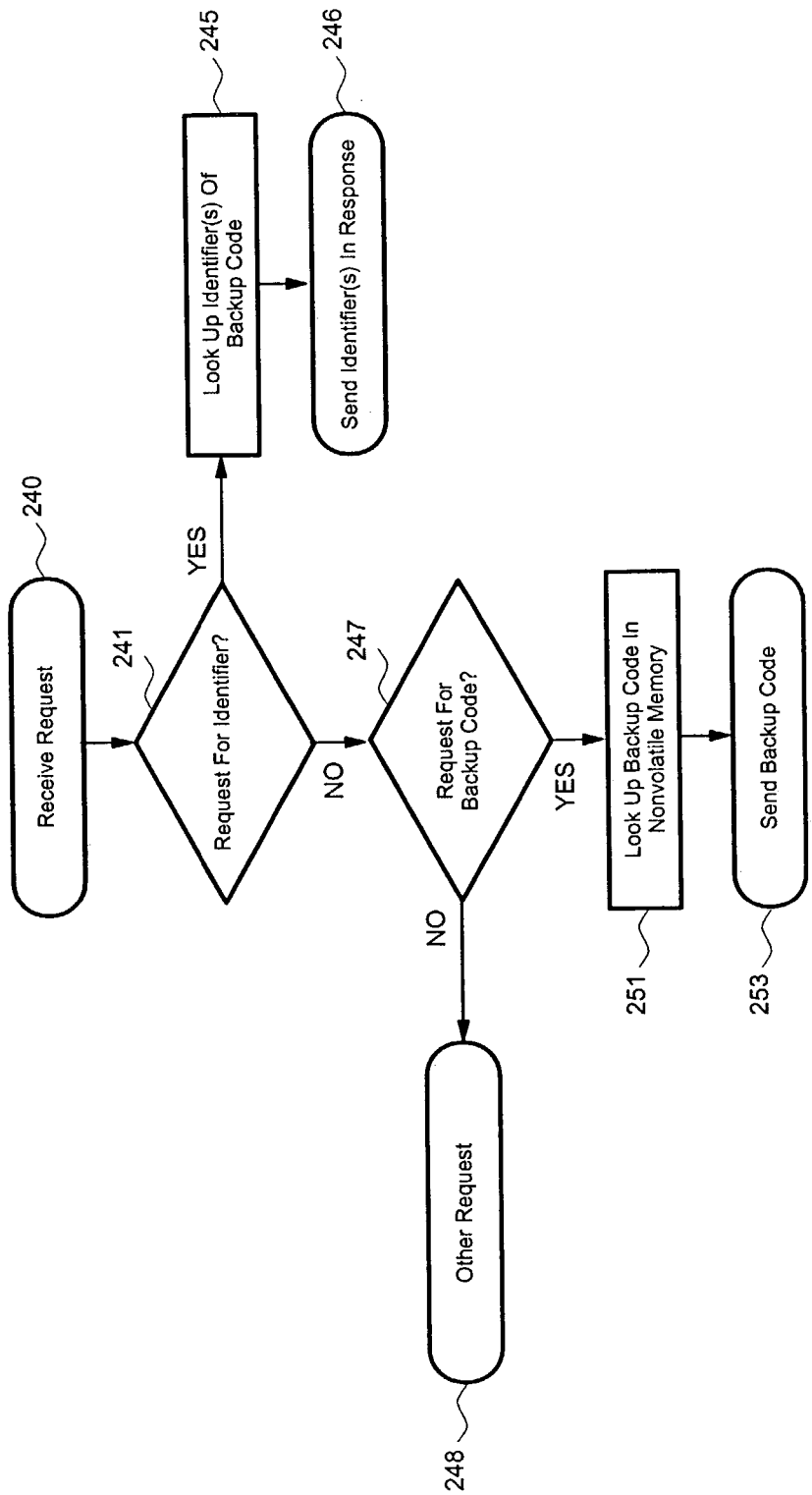

FIG. 4 represents an embodiment of the process of a processor node receiving a request for an identifier or a request for backup code, beginning at step 240. Step 241 determines whether the request is for an identifier only, which may be for the type(s) of backup code and/or for the level(s) of backup code. If so, the processing unit of the processor node looks up the requested identifier(s) of the requested type(s) and level(s) in step 245 and sends the identifier(s) in step 246. Referring additionally to FIGS. 1 and 2B, for example, processing unit 112 of processor node 102 sends the identifiers for backup code 161 and backup code 163.

If step 241 of FIG. 4 determines that the request is not for an identifier, step 247 determines whether the request is for backup code. If not, another request is being made, leading to step 248.

As an alternative, steps 241, 247 and 248 may comprise a lookup to determine what request has been received.

If step 247 determines that the received request is for backup code, the processing unit of the processor node looks up the requested backup code in step 251 and sends the backup code in step 253. Referring additionally to FIGS. 1, 2A and 2B, for example, in response to a request by processing unit 111, processing unit 112 of processor node 102 sends the backup code 161.

Alternative arrangements of the steps of FIG. 4 can be envisioned by those of skill in the art. For example, steps 241, 245 and 246 are not needed if the requesting processor node maintains information about which processor node(s) have backup code.

Figure 5:
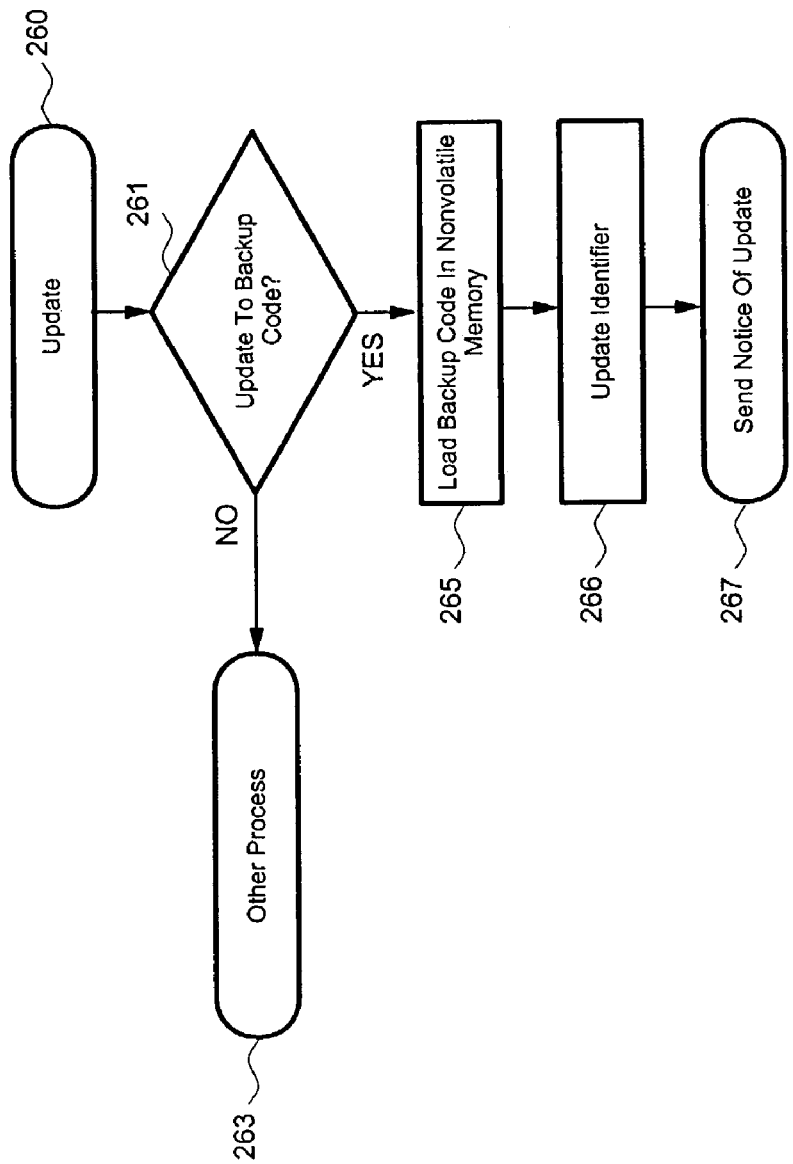

FIG. 5 represents an embodiment of the process of a processor node whose backup code for another processor node is updated, for example, to a new level. The processing unit of a processor node additionally maintains identification of the level of the backup code. The backup process begins at step 260. Step 261 determines whether the process is an update to backup code, and, if not, indicates that another process is involved at step 263. If so, step 265 loads the updated, or updated portion of, the backup code to the nonvolatile memory, and, in step 266, updates the identification of the backup code to the new level. Then, in step 267, the processing unit sends notice of the update at the processor interface on the network. The notice may be broadcast to all other processor nodes, or may be sent directly to the processor node that may use the backup code for restoring its code. Referring additionally to FIGS. 1 and 2D, for example, in response to an update to the backup code 173 stored in nonvolatile memory 134 of module 104, processing unit 114 updates its identification of the level of the backup code and sends notice of the identification of the update to the processor node of module 103.

Alternative arrangements of the steps of FIG. 4 can be envisioned by those of skill in the art. For example, step 266 may be eliminated if the identifier(s) is part of the backup code image.

Figure 6A:
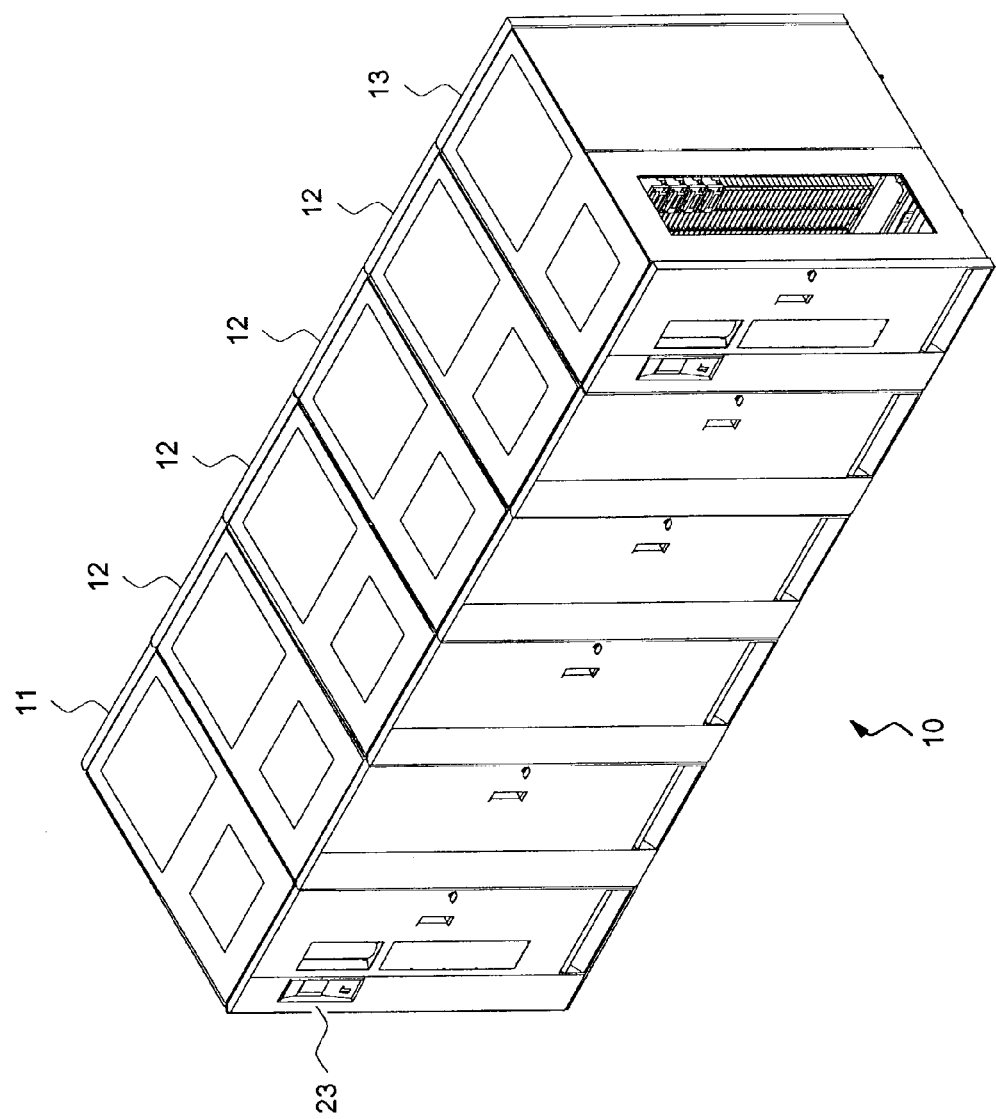
FIGS. 6A and 6B are isometric views of an automated data storage library which may implement an embodiment of a distributed system in accordance with the present invention.
Figure 6B:
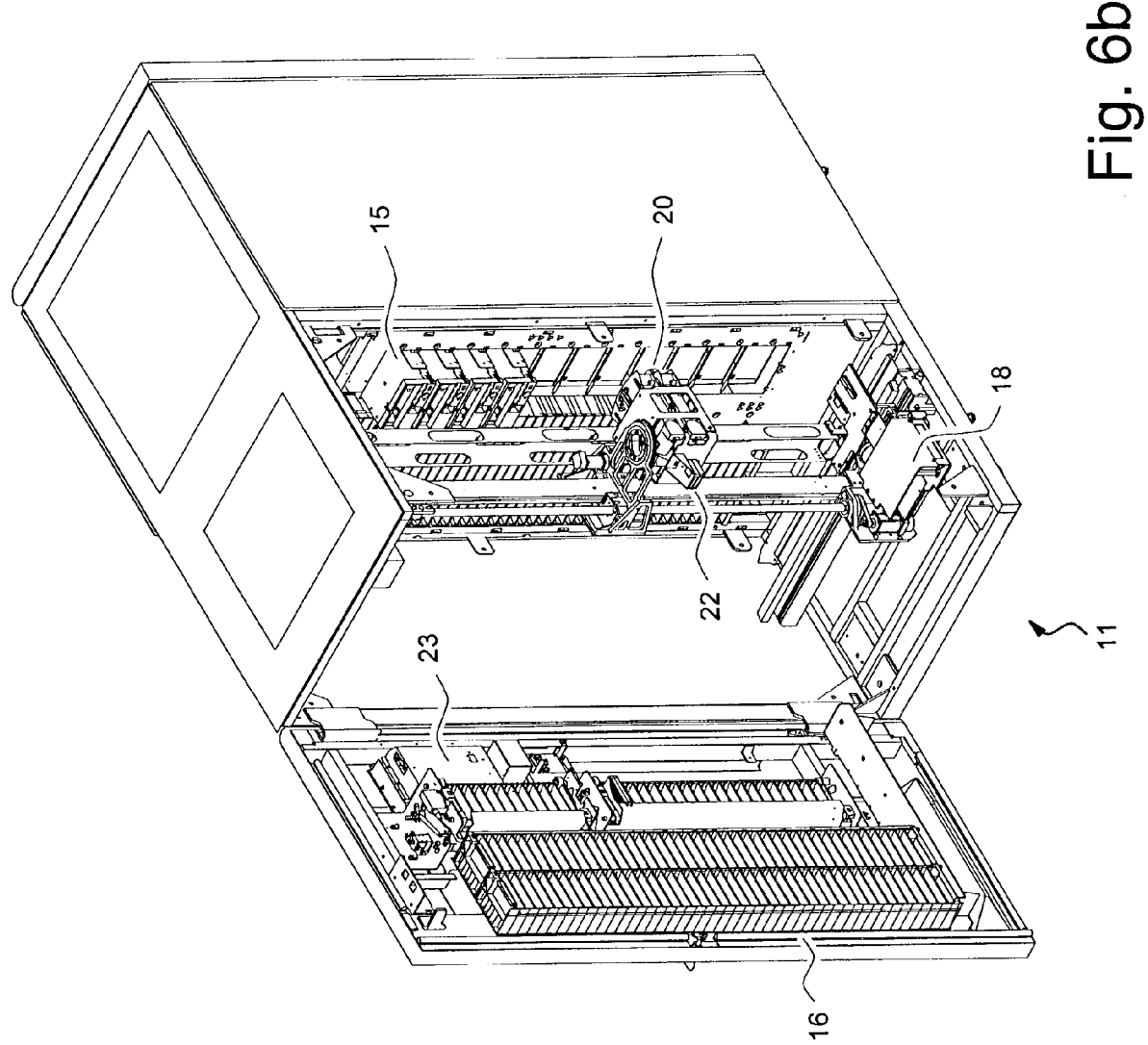

FIGS. 6A and 6B illustrate an embodiment of an automated data storage library 10, which may implement a distributed system in accordance with the present invention. The library is arranged for accessing data storage media (not shown) in response to commands from at least one external host system, and comprises a plurality of storage shelves 16 for storing data storage media; at least one data storage drive 15 for reading and/or writing data with respect to the data storage media; and at least one robot accessor 18 for transporting the data storage media between the plurality of storage shelves 16 and the data storage drive(s) 15. The library may also comprise an operator panel 23 or other user interface, such as a web-based interface, which allows a user to interact with the library. The library 10 may comprise one or more frames 11–13, each having storage shelves 16 accessible by the robot accessor 18. The robot accessor 18 comprises a gripper assembly 20 for gripping one or more data storage media and may include a bar code scanner 22 or reading system, such as a smart card reader or similar system, mounted on the gripper 20, to "read" identifying information about the data storage media.

Figure 7:
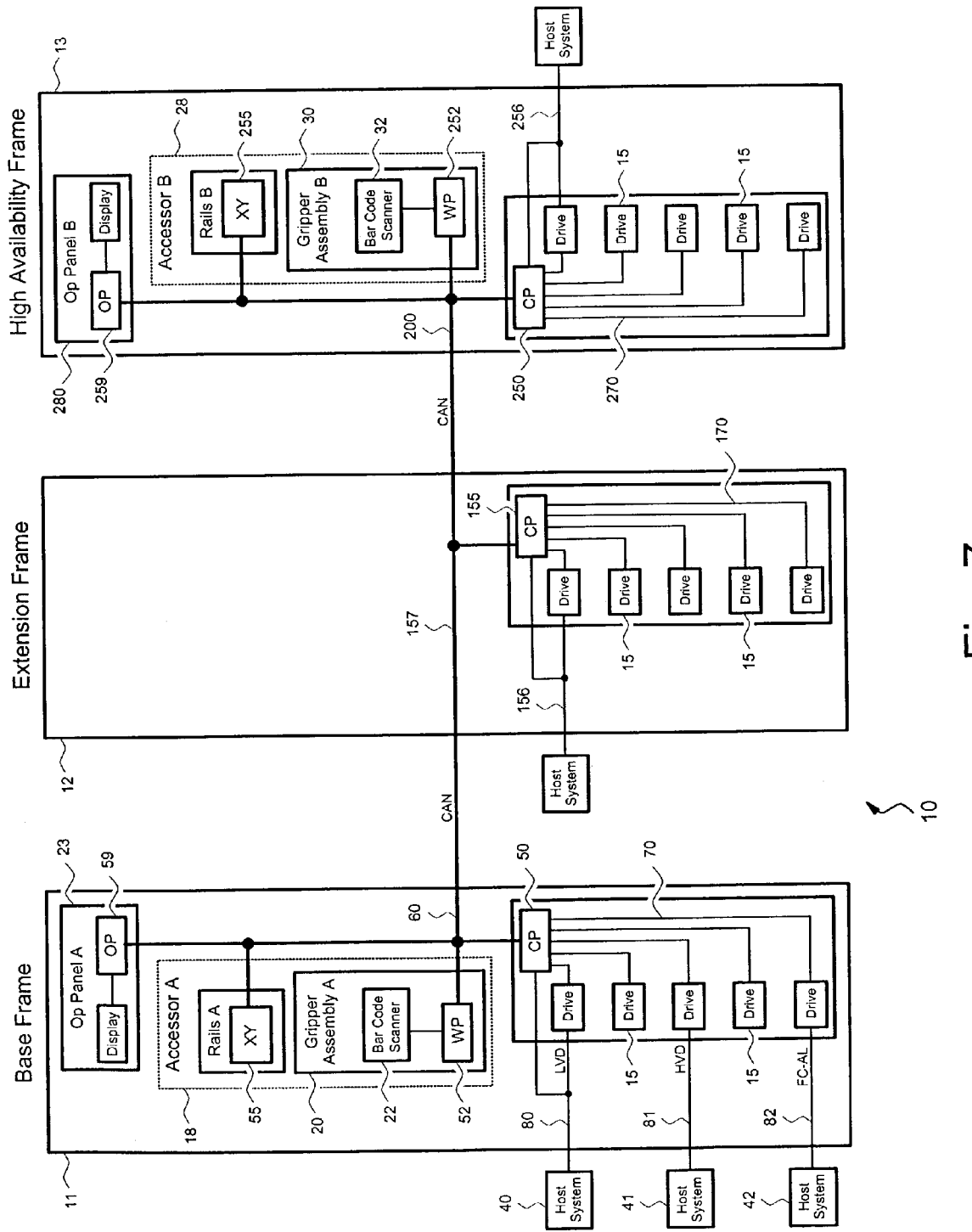
FIG. 7 is a block diagrammatic representation of an embodiment of the automated data storage library of FIGS. 6A and 6B, employing a distributed system in accordance with the present invention.

FIG. 7 illustrates an embodiment of a data storage library 10 of FIGS. 6A and 6B, which employs a distributed system of modules with a plurality of processor nodes in accordance with the present invention. An example of a data storage library which may implement the present invention is the IBM 3584 UltraScalable Tape Library. The library comprises a base frame 11, may additionally comprise one or more extension frames 12, and may comprise a high availability frame 13.

The base frame 11 of the library 10 comprises one or more data storage drives 15, and a robot accessor 18. As discussed above, the robot accessor 18 comprises a gripper assembly 20 and may include a reading system 22 to "read" identifying information about the data storage media. The data storage drives 15, for example, may be optical disk drives or magnetic tape drives, and the data storage media may comprise optical or magnetic tape media, respectively, or any other removable media and associated drives. As examples, a data storage drive may comprise an IBM LTO Ultrium Drive, etc. Additionally, a control port may be provided, which acts to communicate between a host and the library, e.g., receiving commands from a host and forwarding the commands to the library, but which is not a data storage drive.

The extension frame 12 comprises additional storage shelves, and may comprise additional data storage drives 15. The high availability frame 13 may also comprise additional storage shelves and data storage drives 15, and comprises a second robot accessor 28, which includes a gripper assembly 30 and may include a bar code scanner 32 or other reading device, and an operator panel 280 or other user interface. In the event of a failure or other unavailability of the robot accessor 18, or its gripper 20, etc., the second robot accessor 28 may take over.

In the exemplary library, each of the robot accessors 18, 28 moves its gripper in at least two directions, called the horizontal "X" direction and vertical "Y" direction, to retrieve and grip, or to deliver and release the data storage media at the storage shelves 16 and to load and unload the data storage media at the data storage drives 15.

The exemplary library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage shelves and the data storage drives. The commands are typically logical commands identifying the media and/or logical locations for accessing the media.

The exemplary library is controlled by a distributed control system receiving the logical commands from hosts, determining the required actions, and converting the actions to physical movements of the robot accessor 18, 28.

In the exemplary library, the distributed control system comprises a plurality of processor nodes, each having one or more processors. In one example of a distributed control system, a communication processor node 50 may be located in the base frame 11. The communication processor node provides a communication link for receiving the host commands, either directly or through the drives 15, via at least one external interface, e.g., coupled to line 80. The communication processor node 50 may additionally provide a communication link 70 for communicating with the data storage drives 15.

The communication processor node 50 may be located in the frame 11, close to the data storage drives 15. Additionally, in an example of a distributed processor system, one or more additional work processor nodes are provided, which may comprise, e.g., a work processor node 52 that may be located at the robot accessor 18, and that is coupled to the communication processor node 50 via a network 60. Each work processor node may respond to received commands that are broadcast to the work processor nodes from any communication processor node, and the work processor node may also direct the operation of the robot accessor, providing move commands. An XY processor node 55 may be provided and may be located at an XY system of the robot accessor 18. The XY processor node 55 is coupled to the network 60, and is responsive to the move commands, operating the XY system to position the gripper 20.

Also, an operator panel processor node 59 may be provided at the operator panel 23 for providing an interface for communicating between the operator panel and the communication processor node 50, the work processor node 52, and the XY processor node 55.

A network, for example comprising a common bus 60, is provided, coupling the various processor nodes. The network may comprise a robust wiring network, such as the commercially available CAN (controller area network) bus system, which is a multi-drop network, having a standard access protocol and wiring standards, for example, as defined by CiA, the CAN in Automation Association, Am Weich selgarten 26, D-91058 Erlangen, Germany. Other similar networks, such as Ethernet, or a wireless network system, such as RF or infrared, may be employed in the library as is known to those of skill in the art.

The communication processor node 50 is coupled to each of the data storage drives 15 of the base frame 11, via lines 70, communicating with the drives and with host systems 40, 41 and 42. Alternatively, the host systems may be directly coupled to the communication processor node 50 at input 80, or to control port devices (not shown) which connect the library to the host system(s) with a library interface similar to the drive/library interface. As is known to those of skill in the art, various communication arrangements may be employed for communication with the hosts and with the data storage drives. In the example of FIG. 7, host connections 80 and 81 are SCSI busses. Bus 82 comprises an example of a Fibre Channel-Arbitrated Loop which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70.

An extension frame 12 may be provided, and may be coupled by an extension network 157, into the network 157, 60. Another communication processor node 155, similar to communication processor node 50, may be located in the extension frame and may communicate with hosts, e.g., at input 156, and data storage drives 15 in extension frame 12, e.g., via lines 170. The communication processor node 155 is coupled to the network 157, 60, the communication processor node 155 providing a communication link for the commands to the network 157, 60 so that the commands are linked to the base frame work processor node 52.

The communication processor node 155 may be mounted in the extension frame 12, closely adjacent to the coupled data storage drives 15 of the extension frame 12, communicating with the drives and with the attached host systems. The data storage drives 15 are also individually coupled to the communication processor node 155 by means of lines 170.

Additional extension frames with identical communication processor nodes 155, storage shelves, data storage drives 15, and extension networks 157, may be provided and each is coupled to the adjacent extension frame.

Further, the data storage library 10 may additionally comprise another robot accessor 28, for example, in a high availability frame 13. The robot accessor 28 may comprise a gripper 30 for accessing the data storage media, and an XY system 255 for moving the robot accessor. The high availability frame may be adjacent an extension frame 12, or adjacent the base frame 11, and the robot accessor 28 may run on the same horizontal mechanical path as robot accessor 18, or on an adjacent path. The exemplary control system additionally comprises an extension network 200 forming a network coupled to network 157 of an extension frame or to the network 60 of the base frame. Another communication processor node 250 may be provided, which is also similar to communication processor node 50, and may be located in the high availability frame 13, for receiving commands from hosts, either directly at input 256, or through control ports (not shown), or through the data storage drives 15 and lines 270, e.g., at input 256. The communication processor node 250 is coupled to the high availability frame network 200 and provides a communication link to the network.

The communication processor node 250 may be mounted closely adjacent to the coupled data storage drives 15 of the high availability frame 13, communicating with the drives and with the attached host systems. The data storage drives 15 are also individually coupled to the communication processor node 250 by means of lines 270, and using an interface such as RS-422.

A computer program product implementing the present invention may be provided at one of the processor nodes, e.g., at work processor 52, or, optionally at processor 50, processor 155, or processor 250, or may be implemented in a plurality, or all, of the processor nodes.

Referring additionally to FIGS. 8A, 8B, 8C and 8D, in accordance with an embodiment of the present invention, nonvolatile memory of ones or all of the modules stores the code for the processing unit for operating the associated module, and stores backup code for at least one other processing unit of another processor node in the network, the backup code for operating an associated module of the another processor node. For example, a nonvolatile memory 331 of one or each of the communication processor node 50, communication processor node 155, and communication processor node 250, stores the code 351 for the processing unit for operating the associated module, and stores backup code 362 for the processing unit of the operator panel processor node 59 and/or operator panel processor node 259. A nonvolatile memory 332 of one or each of the operator panel processor node 59 and operator panel processor node 259, stores the code 352 for the processing unit for operating the associated module, and stores backup code 361 for the processing unit of the communication processor node 50, communication processor node 155, and/or communication processor node 250. A nonvolatile memory 333 of one or each of the work processor node 52 and work processor node 252 stores the code 353 for the processing unit for operating the associated module, and stores backup code 364 for the processing unit of the XY processor node 55 and/or XY processor node 255. A nonvolatile memory 334 of one or each of the XY processor node 55 and XY processor node 255 stores the code 354 for the processing unit for operating the associated module, and stores backup code 363 for the processing unit of the work processor node 52 and work processor node 252.

Thus, as discussed above, in response to a request, a processing unit of a processor node supplies the backup code 362, 361, 364, 363 of its nonvolatile memory 331, 332, 333, 334 to the requesting processor node to be used to restore the code 351, 352, 353, 354 for operating the module associated with the requesting processor node.

The nonvolatile memories 331, 332, 333, 334 may also separately store common code, such as the computer program product of the present invention, and/or some communication code common to all processor nodes, etc. Further, the nonvolatile memories 331, 332, 333, 334 may store backup code for a plurality of processor nodes, or may store no backup code. The processes for restoring code, for responding to requests, and for updating backup code are as discussed above.

While operating code and backup code were discussed as separate, they may be combined as a single unit. For example, the code image of FIG. 8A, comprising a communication processor block 351 and an operator panel block 362, may be combined into a single block that comprises the function provided by each block. In this example, there is no distinction between the operating code 351 and the backup code 362. The single combined block would be used to backup either communication processor nodes or operator panel nodes. Alternatively, the operating code 351, 352, 353, 354 may serve as backup code for a similar module, as discussed above.

While the preferred embodiments of the present invention have been illustrated in detail, it should be apparent that modifications and adaptations to those embodiments may occur to one skilled in the art without departing from the scope of the present invention as set forth in the following claims.

We claim:

1. A distributed system of modules comprising:
   a network; and
   a plurality of modules of various kinds, each comprising at least one associated processor node, said associated processor node comprising;
   a processing unit for operating said associated module;
   a processor interface for providing communication of said processor node in said network; and
   nonvolatile memory for storing code for said processing unit for operating said associated module, and for storing backup code for at least any other processing unit of at least one of any of other processor nodes in said network, said backup code for operating an associated module of said another processor node, said backup code forming a portion of a system aggregate;
   wherein said processing unit of said associated processor node additionally maintains identification of type and level of said code for operating said associated module, said type identification representing the kind of module that said operating code is intended to operate; and comprises logic responsive to receipt of an identification of type and level of backup code at said processor interface, said type identification representing the kind of module that said backup code is intended to operate, for comparing said received identification to said maintained identification; and, in response to said comparison indicating said identification is valid for replacement of said code for operating said associated module, receiving said backup code and replacing at least a portion of said code for operating said associated module with said backup code.

2. The distributed system of claim 1, wherein said processing unit of said associated processor node additionally comprises logic responsive to a restore signal to send a request at said processor interface for an identification of type and level of backup code; in response to receiving a response to said request at said processor interface, for comparing said received identification to said maintained identification; and, in response to said comparison indicating said identification is valid for replacement of said code for operating said associated module, receiving said backup code and replacing at least a portion of said code for operating said associated module with said backup code.

3. A processor node for association with a module of a distributed system of modules of various kinds, at least a plurality of said modules having associated processor nodes interconnected in a network, said processor node comprising:
   a processing unit for operating said associated module;
   a processor interface for providing communication of said processor node in said network; and
   nonvolatile memory for storing code for said processing unit for operating said associated module, and for storing backup code for at least any other processing unit of at least one of any of other processor nodes in said network, said backup code for operating an associated module of said another processor node, said backup code forming a portion of a system aggregate;
   wherein said processing unit additionally maintains identification of type and level of said code for operating said associated module, said type identification representing the kind of module that said operating code is intended to operate; and comprises logic responsive to receipt of an identification of type and level of backup code at said processor interface, said type identification representing the kind of module that said backup code is intended to operate, for comparing said received identification to said maintained identification; and, in response to said comparison indicating said identification is valid for replacement of said code for operating said associated module, receiving said backup code and replacing at least a portion of said code for operating said associated module with said backup code.

4. The processor node of claim 3, wherein said processing unit additionally comprises logic responsive to a restore signal to send a request at said processor interface for an identification of type and level of backup code; in response to receiving a response to said request at said processor interface, for comparing said received identification to said maintained identification; and, in response to said comparison indicating said identification is valid for replacement of said code for operating said associated module, receiving said backup code and replacing at least a portion of said code for operating said associated module with said backup code.

5. A module for a distributed system of modules of various kinds interconnected in a network, said module comprising:
    a system for performing a modular function; and
    a processor node associated with said module, said processor node comprising:
        a processing unit for operating said associated module to perform said modular function;
        a processor interface for providing communication of said processor node in said network; and
        nonvolatile memory for storing code for said processing unit for operating said associated module, and for storing backup code for at least any other processing unit of at least one of any of other processor nodes in said network, said backup code for operating an associated module of said another processor node, said backup code forming a portion of a system aggregate;
    wherein said processing unit of said associated processor node additionally maintains identification of type and level of said code for operating said associated module, said type identification representing the kind of module that said operating code is intended to operate; and comprises logic responsive to receipt of an identification of type and level of backup code at said processor interface, said type identification representing the kind of module that said backup code is intended to operate, for comparing said received identification to said maintained identification; and, in response to said comparison indicating said identification is valid for replacement of said code for operating said associated module, receiving said backup code and replacing at least a portion of said code for operating said associated module with said backup code.

6. The module of claim 5, wherein said processing unit of said associated processor node additionally comprises logic responsive to a restore signal to send a request at said processor interface for an identification of type and level of backup code; in response to receiving a response to said request at said processor interface, for comparing said received identification to said maintained identification; and, in response to said comparison indicating said identification is valid for replacement of said code for operating said associated module, receiving said backup code and replacing at least a portion of said code for operating said associated module with said backup code.

7. A computer program product usable with a programmable computer processor having computer readable program code embodied therein, said programmable computer processor for association with a module of a distributed system of modules of various kinds, at least a plurality of said modules having associated processor nodes interconnected in a network, said computer program product comprising:
    computer readable program code which causes said programmable computer processor to store code for operating said associated module; and
    computer readable program code which causes said programmable computer processor to store backup code for at least any other processing unit of at least one of any of other processor nodes in said network, said backup code for operating an associated module of said another processor node, said backup code forming a portion of a system aggregate, wherein said computer readable program code additionally causes said programmable computer processor to: maintain identification of type and level of said code for operating said associated module, said type identification representing the kind of module that said operating code is intended to operate; and respond to receipt of an identification of type and level of backup code at said processor interface, said type identification representing the kind of module that said backup code is intended to operate, comparing said received identification to said maintained identification; and, in response to said comparison indicating said identification is valid for replacement of said code for operating said associated module, receive said backup code and replace at least a portion of said code for operating said associated module with said backup code.

8. The computer program product of claim 7, wherein said computer readable program code additionally causes said programmable computer processor to: respond to a restore signal, sending a request at said processor interface for an identification of type and level of backup code; in response to receiving a response to said request at said processor interface, compare said received identification to said maintained identification; and, in response to said comparison indicating said identification is valid for replacement of said code for operating said associated module, receive said backup code and replace at least a portion of said code for operating said associated module, with said backup code.

9. An automated data storage library, comprising:
    a network; and
    a plurality of modules of various kinds, each for performing a modular function of said automated data storage library, at least a plurality of said modules each comprising at least one associated processor node, said associated processor node comprising:
        a processing unit for operating said associated module;
        a processor interface for providing communication of said processor node in said network; and
        nonvolatile memory for storing code for said processing unit for operating said associated module, and for storing backup code for at least any other processing unit of at least one of any of other processor nodes in said network, said backup code for operating an associated module of said another processor node, said backup code forming a portion of a system aggregate;
    wherein said processing unit of said associated processor node additionally maintains identification of type and level of said code for operating said associated module, said type identification representing the kind of module that said operating code is intended to operate; and comprises logic responsive to receipt of an identification of type and level of backup code at said processor interface, said type identification representing the kind of module that said backup code is intended to operate, for comparing said received identification to said maintained identification; and, in response to said comparison indicating said identification is valid for replacement of said code for operating said associated module, receiving said backup code and replacing at least a portion of said code for operating said associated module with said backup code.

10. The automated data storage library of claim 9, wherein said processing unit of said associated processor node additionally comprises logic responsive to a restore signal to send a request at said processor interface for an identification of type and level of backup code; in response to receiving a response to said request at said processor interface, for comparing said received identification to said maintained identification; and, in response to said comparison indicating said identification is valid for replacement of said code for operating said associated module, receiving said backup code and replacing at least a portion of said code for operating said associated module with said backup code.

* * * * *